March 5, 1963
G. C. ROGERS ETAL
3,080,302
PROCESS AND APPARATUS FOR CONVERTING
NON-POTABLE WATER TO POTABLE WATER
Filed Nov. 4, 1958
2 Sheets-Sheet 1
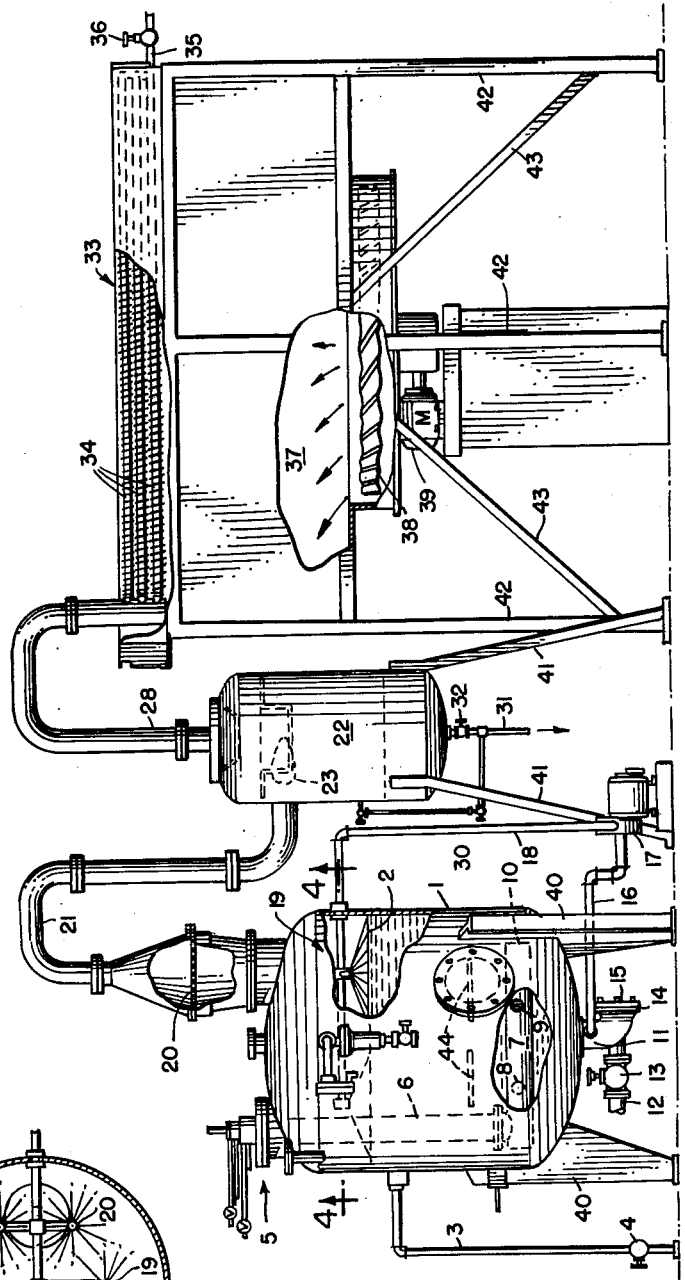
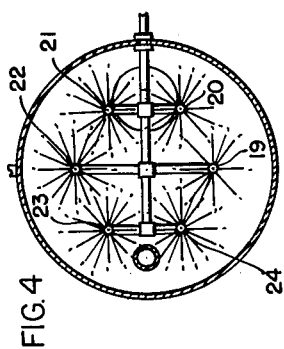
*INVENTORS:*
GAIL C. ROGERS
ARTHUR WILLIAMS
BY *Marzall, Johnston, Cook & Root*
ATT'YS

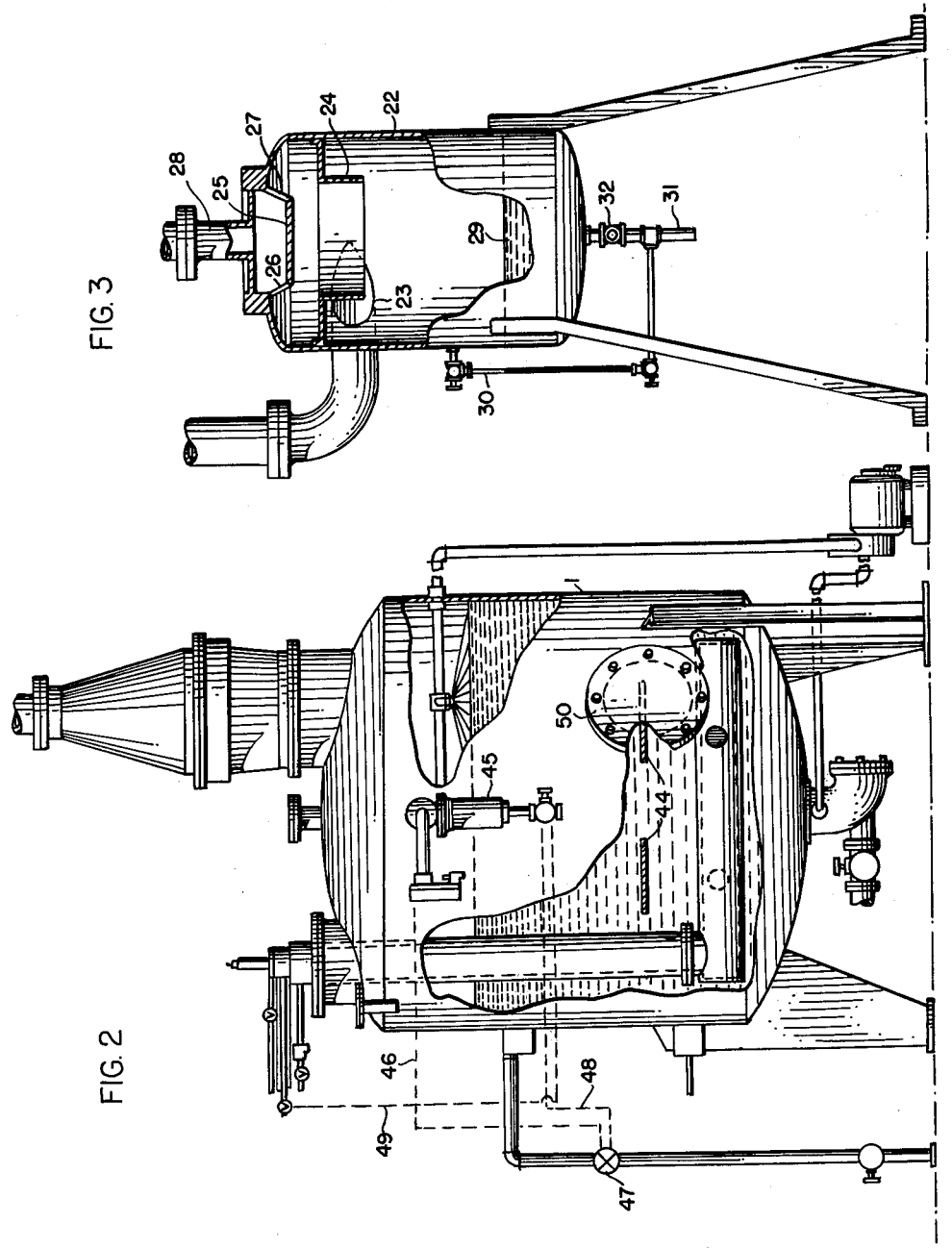

United States Patent Office 3,080,302
Patented Mar. 5, 1963

3,080,302
PROCESS AND APPARATUS FOR CONVERTING NON-POTABLE WATER TO POTABLE WATER
Gail C. Rogers, Los Altos, Calif., and Arthur Williams, Munster, Ind., assignors to Submerged Combustion, Inc., Hammond, Ind., a corporation of Indiana
Filed Nov. 4, 1958, Ser. No. 771,913
5 Claims. (Cl. 202—66)

This invention relates to an apparatus for converting non-potable water to potable water, and more particularly to an apparatus which is suitable for converting brackish well water containing salts and traces of oil to a potable water.

One of the objects of the invention is to provide a new and improved apparatus of the type described which can be operated in arid countries on waste gases from oil producing wells.

Still another object of the invention is to provide a method and apparatus for converting a non-potable water containing a relatively high concentration of solids to a potable water by a continuous operation requiring a minimum number of shutdowns for cleaning the apparatus.

Another object of the invention is to provide a method and apparatus of the type described which utilizes submerged combustion.

Other objects and advantages of the invention will appear from the following description in conjunction with the accompanying drawings in which FIG. 1 illustrates a preferred form of apparatus suitable for the practice of the invention;

FIG. 2 is an enlargement of the evaporating portion of the apparatus in FIG. 1;

FIG. 3 is an enlarged portion of the apparatus shown in FIG. 1 wherein liquids and vapors are separated, and FIG. 4 is a section taken along the line 4—4 of FIG. 1.

In general, the apparatus of the invention comprises a closed evaporating vessel 1, preferably means for maintaining a liquid level 2 within predetermined limits within said vessel 1, means for introducing non-potable water containing dissolved solids into said vessel 1 beneath said liquid level 2, such as, for example, a pipe 3 connected through a valve 4 to a well or other suitable source of water, means for introducing hot gases into said water beneath said liquid level 2 to cause vaporization of the water, preferably a submerged combustion burner generally indicated at 5 which has an elongated combustion chamber 6 extending downwardly into the water and connected to a transverse conduit or pipe portion 7 having openings 8 and 9 in opposite sides thereof and a closed end 10, preferably means for recirculating said water from a point near the bottom of said vessel 1 to a point above said liquid level 2 including means to spray said recirculated water on to the surface of the water in said vessel, an evaporator outlet above the liquid level in the evaporator, a separator for separating gases from liquids, said separator having a vapor outlet and a liquid outlet, conduit or pipe means connecting said evaporator outlet to said separator, a condenser, conduit or pipe means connecting said separator vapor outlet with said condenser, and preferably means for controlling the removal of said liquid from said liquid outlet of said separator.

The system for recirculating the water from a point near the bottom of the vessel 1 to a point above the liquid level preferably consists of an outlet 11 to which is connected to an outlet pipe 12 controlled by a valve 13 and which also has a larger outlet 14 provided with a manhole cover 15 that can be removed for cleaning out sludge and large particles. As shown in the drawings a pipe 16 connects the outlet 11 through a pump 17 to a pipe 18. The pump 17 recirculates the water at a suitable rate depending upon the size of the apparatus.

For instance, in an apparatus of the type shown wherein the vessel 1 is approximately seven feet in diameter and the water level 2 is approximately five feet, a suitable circulating rate is around two hundred gallons per minute. The recirculated water is introduced above the liquid level 2 from spray nozzles 19, 20, 21, 22, 23 and 24 as shown in FIG. 4, the spray pattern preferably being such as to cover substantially the entire area of the liquid. Approximately the upper third of the evaporating vessel 1 is a vapor space generally indicated at 19 from which steam formed by the evaporation passes upwardly through a de-mister generally shown at 20. The de-mister preferably consists of rolled corrosion resistant metal wire in spring shape held together with metal bars on twelve inch centers. This is a conventional type of de-mister and does not constitute a part of the invention per se.

The vapors passing through the de-mister 20 enter a conduit 21 and thence pass to separator 22 which, as shown in the drawings, is preferably a centrifugal separator into which the vapors enter tangentially through an opening 23. As shown in more detail in FIG. 3 the centrifugal separator 22 is provided with a tubular baffle 24 and a flat circular disc-like baffle 25 which is held in place by means of arms such as 26 and 27, there being preferably at least three arms so that the vapors can pass through the openings in the resultant spider arrangement to the outlet pipe 28. The liquid 29 which collects in the bottom of separator 22, the depth of which is indicated by the sight glass 30, is blown off through pipe 31 controlled by valve 32.

The steam vapors which pass through pipe 28 are condensed in a suitable condenser 33. In the drawings the condenser shown is an air condenser wherein the vapors to be condensed pass through banks of fin tubes 34 and the condensate is removed through pipe 35 controlled by valve 36. In this type of condenser there is a large air chamber 37 beneath the fin tubes 34 and through which air is circulated by means of a large rotary fan 38 run by a motor 39. It will be understood that other types of condensers can be used. The type of condenser shown, however, will operate satisfactorily in arid countries.

The various elements of the apparatus are supported on the ground by suitable supports in the manner indicated. Thus, the evaporating vessel 1 is supported by at least three legs 40. The centrifugal separator 22 is supported by either three or four legs 41 and the condenser is supported by legs 42 and braced by cross member 43.

While the invention is not limited to the use of a submerged combustion burner for heating the liquid in the evaporator it is preferable to heat the liquid with hot gases composed of products of combustion. These gases contain carbon dioxide and tend to reduce the amount of sludging and build-up on the burner elements. It should be noted further that as the hot gases issue from the openings 8 and 9 in the lower leg of the L-shaped portion of the burner they pass upwardly through the liquid to be heated but their upward passage is deflected somewhat by circular baffles 44 which in a burner having dimensions of the type described are each preferably around three feet in diameter. The circular baffles 44 in combination with the recirculating water system and the atomizing nozzles 19-24 help to reduce the amount of water carried over with the steam vapor.

The submerged burner shown in the drawings is of a conventional type and no invention is claimed for the burner per se. In this type of burner there is an internal ignition element which serves to ignite pilot gas, the combustion of which is supported by pilot air. The ignited gas in turn serves to ignite a larger flow of gas usually referred to as "primary gas" and a larger flow of air to support the combustion of the primary gas is also provided by means of a compressor or other suitable means, not shown.

In the present apparatus it is desirable to control the liquid level by a suitable conventional liquid level control device such as shown at 45. This device is connected in any suitable manner as generally indicated at 46 to a valve 47 which shuts off the incoming water when the water level becomes too high. It is also connected, as generally indicated at 48, to the water control valve 47 so as to open said valve and allow more water to enter the evaporator when the water level is too low. Additionally, the level control is preferably connected in any suitable manner as generally shown at 49 to shut off the burner when the water level in the evaporator is extremely low. The manner in which this is accomplished is not per se a part of the invention.

It will be recognized that the invention is subject to some variation and modification in the manner of its practical application. For example, the evaporator vessel 1 is preferably provided with a large manhole 50, the cover of which can be removed for cleaning purposes. The centrifugal separator 22 is also preferably provided with a level control, not shown, which operates to automatically blow down or remove the liquid 29 by opening valve 32 when the liquid level reaches a predetermined point. The liquid in the separator can be removed continuously or periodically either by manual control of valve 32 or automatically.

The apparatus described was used successfully in making a potable water from a brackish well water having a pH of 6.8 and containing about 22,700 p.p.m. (parts per million) of dissolved salts (including 324 p.p.m. $Ca(HCO_3)_2$; 2864 p.p.m. $CaSO_4$; 2271 p.p.m. $CaCl_2$; 1747 p.p.m. $MgCl_2$ and 13,297 p.p.m. NaCl). The air flow to the burner was 820 cubic foot per minute (c.f.m.); the air pressure to the burner was 18 pounds per square inch (p.s.i.); the temperature of the air to the burner was 213° F.; the gas flow to the burner was 82 c.f.m. (this gas contained 67% $CH_4$ and 17% $CO_2$, the remainder consisting mainly of higher hydrocarbons, i.e., $C_2H_6$, $C_3H_8$, and $C_4H_{10}$); the temperature of the water in the evaporator was 217° F.; the separator blowdown was 30 gallons per minute (g.p.m.) and the product water was recovered from the condenser at the rate of 3.85 gallons per minute.

The invention provides a process and apparatus which produces potable water and operates continuously over long periods of time. It is especially important in producing potable water from brackish water containing dissolved salts and even small amounts of oil amounting to a fraction of a percent or more.

The invention is hereby claimed as follows:

1. In an apparatus for converting non-potable water to potable water, the combination of, a closed evaporating vessel adapted to hold a body of water, means for maintaining a liquid level within predetermined limits within said vessel, means for introducing a non-potable water containing dissolved salts into said vessel beneath said liquid level, means for introducing hot combustion gases containing carbon dioxide into said water beneath said liquid level to cause vaporization of the water, means for recirculating said water directly from below said liquid level to a point above said liquid level consisting essentially of a pump, a conduit connecting the inlet side of said pump to said evaporating vessel beneath said liquid level, a conduit directly connecting the outlet side of said pump to said evaporating vessel above said liquid level, and means connected to said last named conduit to spray said recirculated water onto the surface of the water in said vessel, an evaporator outlet above said liquid level, a separator for separating gases from liquids having a vapor space and a liquid outlet, conduit means connecting said evaporator outlet to said separator, a condenser, conduit means connecting said vapor space of said separator with said condenser, and means to recover condensed potable water from said condenser.

2. An apparatus as claimed in claim 1 wherein said condenser comprises a series of fin tubes, and air blowing means to blow air across said fin tubes to cool said tubes and condense water vapor therein.

3. An apparatus as claimed in claim 1 wherein said means to spray said recirculated water includes a plurality of spray nozzles in said vessel, which nozzles provide a water spray pattern substantially covering the entire upper surface of water in said vessel.

4. A process for converting non-potable water to potable water which comprises establishing a body of water of substantially constant volume in a closed evaporating vessel while producing a vapor space above said body of water, continuously introducing a non-potable water containing dissolved salts into said body of water, continuously burning a fuel beneath the liquid level in direct contact with said body of water, continuously recirculating a portion of said body of water from a point below the liquid level directly to a point above the liquid level, introducing said recirculated water above said liquid level in the form of a spray substantially covering the entire surface of said body of water in said evaporating vessel, continuously removing vapors from said vapor space, passing said vapors so removed to a separate zone externally of said evaporating vessel, centrifugally separating liquids and solids from said vapors in said last named zone, thereafter continuously condensing the vapors from which said liquids and solids have been separated, and recovering the resultant condensate as such.

5. A process as claimed in claim 4 wherein said vapors are condensed in a series of fin tubes over which air is blown to cool said tubes and condense said vapors therein.

References Cited in the file of this patent

UNITED STATES PATENTS

| | | |
|---|---|---|
| 1,943,106 | Burham | Jan. 9, 1934 |
| 2,440,173 | Henszey | Apr. 20, 1948 |
| 2,441,361 | Kirgan | May 11, 1948 |
| 2,649,408 | Williamson et al. | Aug. 18, 1953 |
| 2,764,234 | Rauh | Sept. 25, 1956 |

OTHER REFERENCES

"Fresh Water From the Ocean," Ellis, Feb. 1, 1954, published U.S.A. (pages 153–156).